(12) United States Patent  (10) Patent No.: US 8,468,073 B2
Flake et al.  (45) Date of Patent: Jun. 18, 2013

(54) FACILITATING COMPENSATION ARRANGEMENTS PROVIDING FOR DATA TRACKING COMPONENTS

(75) Inventors: Gary W. Flake, Bellevue, WA (US);
Royce A. Levien, Lexington, MA (US);
Robert W. Lord, Seattle, WA (US);
William Henry Mangione-Smith, Kirkland, WA (US); Richard F. Rashid, Redmond, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 892 days.

(21) Appl. No.: 12/220,918

(22) Filed: Jul. 28, 2008

(65) Prior Publication Data
US 2009/0327066 A1 Dec. 31, 2009

Related U.S. Application Data

(63) Continuation-in-part of application No. 12/217,138, filed on Jun. 30, 2008.

(51) Int. Cl.
*G06Q 40/00* (2012.01)
(52) U.S. Cl.
USPC ............... 705/35; 705/34; 709/224; 707/758
(58) Field of Classification Search
USPC ............. 705/34; 709/224; 711/167; 707/758
See application file for complete search history.

(56) References Cited

U.S. PATENT DOCUMENTS

| | | | |
|---|---|---|---|
| 4,870,591 A | 9/1989 | Cicciarelli et al. | |
| 4,961,224 A | 10/1990 | Yung | |
| 4,962,532 A | 10/1990 | Kasiraj et al. | |
| 5,768,521 A * | 6/1998 | Dedrick | 709/224 |
| 5,884,270 A | 3/1999 | Walker et al. | |
| 6,061,692 A | 5/2000 | Thomas et al. | |
| 6,061,789 A | 5/2000 | Hauser et al. | |
| 6,735,601 B1 | 5/2004 | Subrahmanyam | |
| 6,886,000 B1 | 4/2005 | Aggarwal et al. | |
| 6,961,562 B2 | 11/2005 | Ross | |
| 7,269,664 B2 | 9/2007 | Hutsch et al. | |
| 7,801,905 B1 * | 9/2010 | Singh et al. | 707/758 |
| 2001/0032210 A1 | 10/2001 | Frank et al. | |
| 2001/0049681 A1 | 12/2001 | Bova | |
| 2001/0051940 A1 | 12/2001 | Soulanille | |
| 2001/0052761 A1 | 12/2001 | Taniguchi et al. | |
| 2002/0004727 A1 | 1/2002 | Knaus et al. | |
| 2002/0010679 A1 | 1/2002 | Felsher | |
| 2002/0099605 A1 | 7/2002 | Weitzman et al. | |

(Continued)

OTHER PUBLICATIONS

U.S. Appl. No. 12/221,465, Flake et al.

(Continued)

*Primary Examiner* — Samica L Norman

(57) ABSTRACT

Systems and methods for data brokering, and more specifically, data brokering regarding a data provider's search-related activities, are described. In particular implementations, various aspects of facilitating a compensation arrangement between a data provider and a data consumer regarding one or more data-provider-related search activities, including aspects of arranging for compensation to be received from the data consumer in exchange for at least one of installation of or access of a data tracking component related to at least one user interface associated with the data provider, are described.

63 Claims, 9 Drawing Sheets

U.S. PATENT DOCUMENTS

| | | | |
|---|---|---|---|
| 2002/0143596 | A1 | 10/2002 | Carmody |
| 2003/0033161 | A1 | 2/2003 | Walker et al. |
| 2003/0163416 | A1 | 8/2003 | Kitajima |
| 2003/0220844 | A1 | 11/2003 | Marnellos et al. |
| 2003/0225989 | A1* | 12/2003 | Licalsi ................ 711/167 |
| 2004/0068460 | A1 | 4/2004 | Feeley et al. |
| 2004/0073570 | A1 | 4/2004 | Janakiraman et al. |
| 2004/0167845 | A1 | 8/2004 | Corn et al. |
| 2005/0021359 | A1 | 1/2005 | McKinney |
| 2005/0097024 | A1 | 5/2005 | Rainey |
| 2005/0197972 | A1 | 9/2005 | Kettner et al. |
| 2006/0155842 | A1 | 7/2006 | Yeung et al. |
| 2007/0130005 | A1 | 6/2007 | Jaschke |
| 2007/0258460 | A1 | 11/2007 | Momtahan et al. |
| 2008/0120162 | A1 | 5/2008 | Carmody |
| 2008/0215493 | A1 | 9/2008 | Ong et al. |
| 2008/0228403 | A1 | 9/2008 | Robertsson |
| 2009/0106084 | A1 | 4/2009 | Or |
| 2010/0211490 | A1* | 8/2010 | Itoh et al. ................ 705/34 |
| 2010/0250547 | A1 | 9/2010 | Grefenstette et al. |
| 2011/0276452 | A1 | 11/2011 | Stephens |

OTHER PUBLICATIONS

U.S. Appl. No. 12/221,203, Flake et al.

U.S. Appl. No. 12/229,506, Flake et al.

Zaihan Yang and Chengfei Liu, Implementing a Flexible Compensation Mechanism for Business Processes in Web Service Environment, IEEE International Conference on Web Services (ICWS'06)—Jan. 2006.

Palamida, Security Implications of Web 2.0 Services, www.palamida.com—Mar. 2008.

Cisco, Web 2.0 in the Enterprise Cisco IT helps to build a scalable, secure communications and collaboration platform, Cisco on Cisco: Inside Cisco IT Trends in IT—Mar. 2008.

Claye Stokes, Small Business Web Design Guide—Part I, www.clayestokes.com—Jul. 16, 2008.

Dustin Whittle, Yahoo, Web 2.0 Expo—printed on Nov. 19, 2008.

Jesse James Garrett, Ajax: A New Approach to Web Applications Recent, http://adaptivepath.com/ideas/essays/archives/000385.php—Feb. 18, 2005.

William White, RIA Applications and the Web Presentation, Yahoo! Media Innovation Group—printed on Nov. 19, 2008.

Philip McCarthy, Software development consultant, Independent, Ajax for Java developers: Build dynamic Java applications, http://www-128ibm.com/developerworks/library/j-ajax1—Sep. 20, 2005.

Dion Hinchcliffe, Building Next Generation Web 2.0 Applications, www.web20university.com—Apr. 2008.

James Snell, Call Soap Web Services with Ajax Part 1: Build the Web Services Client, http://www-128.ibm.com/developerworks/webservices/library/ws-wsajax—Sep. 18, 2008.

Paul Hammond and Simon Wilson, d.Construct 2006, http://www.paulhammond.org/2006/dconstruct—Sep. 8, 2006.

Steven Webster, Macromedia Flash MX Professional 2004, http://store2.adobe.com/devnet/flash/articles/ria_dataservices.html—Sep. 18, 2008.

Aral Balkan, Mash my Flex up, aralbalkan.com—printed on Nov. 19, 2008.

O'Reilly Media Inc., Mastering Ajax, Part 1: Introduction to Ajax, http://www.ibm.com/developerworks/web/library/wa-ajaxintro1.html—Dec. 6, 2005.

O'Reilly Media Inc., Mastering Ajax, Part 2: Make asynchronous requests with JavaScript and Ajax, http://www-128.ibm.com/developerworks/java/library/wa-ajaxintro2/index.html—Jan. 17, 2006.

Jesse James Garrett, OK/Cancel, http://www.ok-cancel.com/archives/article/2005/09/why-ajax-matters-now.html—Sep. 16, 2005.

Tim O'Reilly, What is Web 2.0, http://r2computing.blogspot.com/2008/04/web-20-democracy-of-ideas.html—Sep. 30, 2005.

O'Reilly Media, Spreading the knowledge of innovators—printed on Nov. 19, 2008.

Satayam, Service-Oriented Architecture (SOA)—2008.

Karl Bishop and Doug Phillips, Using Ajax with WebSphere Portal, http://www.ibm.com/developerworks/websphere/library/techarticles/0606_bishop/0606_bishop.html—Jun. 28, 2006.

O'Reilly Radar, Web 2.0 Principles and Best Practices, Tim O'Reilly, Executive Summary—Fall 2006.

James Snell, Call SOAP Web services with Ajax, Part 1: Build the Web services client, ibm.com/developerWorks—Oct. 11, 2005.

Microsoft Corporation, XML Developer Center, http://msdn.microsoft.com/en-us/xml/default.aspx—printed on Nov. 19, 2008.

Philip McCarthy, Software development consultant, Independent, Ajax for Java developers: Build dynamic Java applications, http://www-128.ibm.com/developerworks/library/j-ajax2—Oct. 4, 2005.

* cited by examiner

310

FACILITATING A COMPENSATION ARRANGEMENT BETWEEN A DATA PROVIDER AND A DATA CONSUMER REGARDING ONE OR MORE DATA-PROVIDER-RELATED SEARCH ACTIVITIES

402 ARRANGING FOR COMPENSATION TO BE RECEIVED FROM THE DATA CONSUMER IN EXCHANGE FOR AT LEAST ONE OF INSTALLATION OF OR ACCESS OF A DATA TRACKING COMPONENT RELATED TO AT LEAST ONE USER INTERFACE ASSOCIATED WITH THE DATA PROVIDER

432 ARRANGING FOR COMPENSATION TO BE RECEIVED FROM A DATA CONSUMER IN EXCHANGE FOR AT LEAST ONE OF INSTALLATION OF OR ACCESS OF A DATA TRACKING COMPONENT LOADED ON A MACHINE ASSOCIATED WITH A SPECIFIC USER

434 ARRANGING FOR COMPENSATION TO BE RECEIVED FROM A DATA CONSUMER IN EXCHANGE FOR AT LEAST ONE OF INSTALLATION OF OR ACCESS OF A DATA TRACKING COMPONENT LOADED ON A MACHINE ASSOCIATED WITH A SPECIFIC USER'S EMPLOYER

436 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN ASPECT OF THE DATA PROVIDER'S ACTIVITIES

438 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AT LEAST ONE OF AN AFFINITY-RELATED ACTIVITY, A HEALTH-RELATED ACTIVITY, A CONSUMER-RELATED ACTIVITY, A PERSONAL-CHARACTERISTIC-RELATED ACTIVITY, OR A BUSINESS ENTITY-RELATED ACTIVITY

440 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN AFFINITY-RELATED ACTIVITY INCLUDING AT LEAST ONE OF A SPORTS AFFINITY ACTIVITY, A RELIGIOUS AFFINITY ACTIVITY, A MUSIC AFFINITY ACTIVITY, A LITERATURE AFFINITY ACTIVITY, A THEATER AFFINITY ACTIVITY, A FILM AFFINITY ACTIVITY, A TELEVISION PROGRAM AFFINITY ACTIVITY, A HOBBY AFFINITY ACTIVITY, A SERVICE AFFINITY ACTIVITY, OR A PRODUCT AFFINITY ACTIVITY

442 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN AFFINITY-RELATED ACTIVITY AND TO PAIR AN ASPECT OF THE AFFINITY-RELATED ACTIVITY WITH AN ASPECT OF A PROFILE OF THE DATA PROVIDER

444 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN AFFINITY-RELATED ACTIVITY AND TO PAIR AN ASPECT OF THE AFFINITY-RELATED ACTIVITY WITH AN ASPECT OF A PRESUMED PROFILE OF THE DATA PROVIDER

Facilitating a Compensation Arrangement Between a Data Provider and a Data Consumer Regarding One or More Data-Provider-Related Search Activities

402 Arranging for compensation to be received from the data consumer in exchange for at least one of installation of or access of a data tracking component related to at least one user interface associated with the data provider

436 Arranging for compensation to be received from a data consumer in exchange for at least one of installation of or access of a component configured to monitor at least one of an affinity-related activity, a health-related activity, a consumer-related activity, a personal-characteristic-related activity, or a business entity-related activity

438 Arranging for compensation to be received from a data consumer in exchange for at least one of installation of or access of a component configured to monitor a health-related activity including at least one of an ailment-related activity, a condition-related activity, a disease-related activity, a treatment-related activity, a prevention-related activity, a diet-related activity, an exercise-related activity, a mental-health related activity, or a wellness-related activity

452 Arranging for compensation to be received from a data consumer in exchange for at least one of installation of or access of a component configured to monitor a health-related activity and to pair an aspect of the health-related activity with an aspect of the data provider

454 Arranging for compensation to be received from a data consumer in exchange for at least one of installation of or access of a component configured to monitor a health-related activity and to pair an aspect of the health-related activity with an aspect of a profile of the data provider

456 Arranging for compensation to be received from a data consumer in exchange for at least one of installation of or access of a component configured to monitor a health-related activity and to pair an aspect of the health-related activity with an aspect of a presumed profile of the data provider

310

FACILITATING A COMPENSATION ARRANGEMENT BETWEEN A DATA PROVIDER AND A DATA CONSUMER REGARDING ONE OR MORE DATA-PROVIDER-RELATED SEARCH ACTIVITIES

402 ARRANGING FOR COMPENSATION TO BE RECEIVED FROM THE DATA CONSUMER IN EXCHANGE FOR AT LEAST ONE OF INSTALLATION OF OR ACCESS OF A DATA TRACKING COMPONENT RELATED TO AT LEAST ONE USER INTERFACE ASSOCIATED WITH THE DATA PROVIDER

436 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN ASPECT OF THE DATA PROVIDER'S ACTIVITIES

438 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AT LEAST ONE OF AN AFFINITY-RELATED ACTIVITY, A HEALTH-RELATED ACTIVITY, A CONSUMER-RELATED ACTIVITY, A PERSONAL-CHARACTERISTIC-RELATED ACTIVITY, OR A BUSINESS ENTITY-RELATED ACTIVITY

462 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A CONSUMER-RELATED ACTIVITY INCLUDING AT LEAST ONE OF A PURCHASING-RELATED ACTIVITY, A SPENDING-RELATED ACTIVITY, AN INCOME-RELATED ACTIVITY, A CREDIT-WORTHINESS-RELATED ACTIVITY, A SUBSCRIPTION-RELATED ACTIVITY, AN ORDERING-RELATED ACTIVITY, A SHOPPING-RELATED ACTIVITY, A BROWSING-RELATED ACTIVITY, A CREDIT CARD-RELATED ACTIVITY, A DEBIT CARD-RELATED ACTIVITY, A CHECK WRITING-RELATED ACTIVITY, A DELIVERY-RELATED ACTIVITY, A COUPON-RELATED ACTIVITY, A SELLING-METHOD-RELATED ACTIVITY, AN OFFERING-RELATED ACTIVITY, A PROMOTIONAL-EVENT-RELATED ACTIVITY, OR AN ADVERTISING-RELATED ACTIVITY

464 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A CONSUMER-RELATED ACTIVITY AND TO PAIR THE CONSUMER-RELATED ACTIVITY WITH AN ASPECT OF A PROFILE OF THE DATA PROVIDER

466 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A CONSUMER-RELATED ACTIVITY AND TO PAIR THE CONSUMER-RELATED ACTIVITY WITH AN ASPECT OF A PRESUMED PROFILE OF THE DATA PROVIDER

FACILITATING A COMPENSATION ARRANGEMENT BETWEEN A DATA PROVIDER AND A DATA CONSUMER REGARDING ONE OR MORE DATA-PROVIDER-RELATED SEARCH ACTIVITIES

402 ARRANGING FOR COMPENSATION TO BE RECEIVED FROM THE DATA CONSUMER IN EXCHANGE FOR AT LEAST ONE OF INSTALLATION OF OR ACCESS OF A DATA TRACKING COMPONENT RELATED TO AT LEAST ONE USER INTERFACE ASSOCIATED WITH THE DATA PROVIDER

436 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN ASPECT OF THE DATA PROVIDER'S ACTIVITIES

438 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AT LEAST ONE OF AN AFFINITY-RELATED ACTIVITY, A HEALTH-RELATED ACTIVITY, A CONSUMER-RELATED ACTIVITY, A PERSONAL-CHARACTERISTIC-RELATED ACTIVITY, OR A BUSINESS ENTITY-RELATED ACTIVITY

472 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A PERSONAL-CHARACTERISTIC-RELATED ACTIVITY INCLUDING AT LEAST ONE OF AN AGE-RELATED ACTIVITY, A GENDER-RELATED ACTIVITY, A RACE-RELATED ACTIVITY, AN INCOME-RELATED ACTIVITY, A GEOGRAPHIC LOCATION-RELATED ACTIVITY, A MARITAL STATUS-RELATED ACTIVITY, AN EDUCATION-RELATED ACTIVITY, AN EMPLOYMENT-RELATED ACTIVITY, A SEXUAL ORIENTATION-RELATED ACTIVITY, A CULTURAL-RELATED ACTIVITY, A PERSONALITY CHARACTERISTIC-RELATED ACTIVITY, OR A DEMOGRAPHIC-RELATED ACTIVITY

474 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A PERSONAL-CHARACTERISTIC-RELATED ACTIVITY AND TO PAIR AN ASPECT OF THE PERSONAL-CHARACTERISTIC-RELATED ACTIVITY WITH AN ASPECT OF A PROFILE OF THE DATA PROVIDER

476 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A PERSONAL-CHARACTERISTIC-RELATED ACTIVITY AND TO PAIR AN ASPECT OF THE PERSONAL-CHARACTERISTIC-RELATED ACTIVITY WITH AN ASPECT OF A PRESUMED PROFILE OF THE DATA PROVIDER

FACILITATING A COMPENSATION ARRANGEMENT BETWEEN A DATA PROVIDER AND A DATA CONSUMER REGARDING ONE OR MORE DATA-PROVIDER-RELATED SEARCH ACTIVITIES

402 ARRANGING FOR COMPENSATION TO BE RECEIVED FROM THE DATA CONSUMER IN EXCHANGE FOR AT LEAST ONE OF INSTALLATION OF OR ACCESS OF A DATA TRACKING COMPONENT RELATED TO AT LEAST ONE USER INTERFACE ASSOCIATED WITH THE DATA PROVIDER

436 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AN ASPECT OF THE DATA PROVIDER'S ACTIVITIES

438 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR AT LEAST ONE OF AN AFFINITY-RELATED ACTIVITY, A HEALTH-RELATED ACTIVITY, A CONSUMER-RELATED ACTIVITY, A PERSONAL-CHARACTERISTIC-RELATED ACTIVITY, OR A BUSINESS ENTITY-RELATED ACTIVITY

482 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A A CORPORATE-RELATED (OR OTHER BUSINESS ENTITY-RELATED) ACTIVITY INCLUDING AT LEAST ONE OF AN EMPLOYMENT-RELATED ACTIVITY, A MANAGEMENT-RELATED ACTIVITY, A MARKETING-RELATED ACTIVITY, A SALES-RELATED ACTIVITY, A PLAN-RELATED ACTIVITY, A PROFIT-RELATED ACTIVITY, A LOSS-RELATED ACTIVITY, AN ASSET-RELATED ACTIVITY, A LIABILITY-RELATED ACTIVITY, AN INVENTORY-RELATED ACTIVITY, AND AN OVERHEAD-RELATED ACTIVITY

484 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A CORPORATE-RELATED (OR OTHER BUSINESS ENTITY-RELATED) ACTIVITY AND TO PAIR AN ASPECT OF THE A CORPORATE-RELATED (OR OTHER BUSINESS ENTITY-RELATED) ACTIVITY WITH AN ASPECT OF A PROFILE OF THE DATA PROVIDER

486 ARRANGING FOR COMPENSATION TO BE RECEIVED FROM A DATA CONSUMER IN EXCHANGE FOR AT LEAST ONE OF INSTALLATION OF OR ACCESS OF A COMPONENT CONFIGURED TO MONITOR A CORPORATE-RELATED (OR OTHER BUSINESS ENTITY-RELATED) ACTIVITY AND TO PAIR AN ASPECT OF THE A CORPORATE-RELATED (OR OTHER BUSINESS ENTITY-RELATED) ACTIVITY WITH A PRESUMED ASPECT OF A PROFILE OF THE DATA PROVIDER

Fig. 9

FACILITATING COMPENSATION ARRANGEMENTS PROVIDING FOR DATA TRACKING COMPONENTS

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 12/217,138 entitled FACILITATING COMPENSATION ARRANGEMENTS FOR DATA BROKERING filed on Jun. 30, 2008, and naming Gary W. Flake, Royce A. Levien, Robert W. Lord, William Henry Mangione-Smith, Richard F. Rashid, Clarence T. Tegreene, and Lowell L. Wood, Jr. as inventors, which is currently co-pending, or is an application of which a currently co-pending application is entitled to the benefit of the filing date.

The United States Patent and Trademark Office (USPTO) has published a notice to the effect that the USPTO's computer programs require that patent applicants reference both a serial number and indicate whether an application is a continuation or continuation in part. Stephen G. Kunin, Benefit of Prior-Filed Application, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

FIELD OF THE DISCLOSURE

The present disclosure relates generally to data brokering, and more specifically, to facilitating compensation arrangements that provide for data tracking components.

BACKGROUND

Individuals that engage in on-line activities, such as on-line search-related activities, typically generate information that may have value to other entities. Such information has often been surreptitiously monitored and gathered by various interested parties who, in turn, may make use of the information for commercial purposes (e.g. advertising).

SUMMARY

The present disclosure teaches systems and methods for data brokering, and more specifically, data brokering regarding a data provider's search-related activities. In particular implementations, the present disclosure teaches aspects of facilitating a compensation arrangement between a data provider and a data consumer regarding one or more data-provider-related search activities, including arranging for compensation to be received from the data consumer in exchange for at least one of installation of or access of a data tracking component related to at least one user interface associated with the data provider.

BRIEF DESCRIPTION OF THE DRAWINGS

FIGS. 4 through 9 are flowcharts of methods of facilitating a compensation arrangement between a data provider and a data consumer that provide for data tracking components in accordance with further implementations of the present disclosure.

DETAILED DESCRIPTION

Techniques for brokering data regarding a data provider's search-related activities are disclosed. In the following detailed description, many specific details of certain implementations are described and shown in FIGS. 1 through 9 to provide a thorough understanding of such implementations. One skilled in the art will understand, however, that the present disclosure may have other possible implementations, and that such other implementations may be practiced with or without some of the particular details set forth in the following description.

In the following discussion, an exemplary environment 100 for implementing one or more of the teachings of the present disclosure is described. Next, an exemplary computing device 200 for implementing one or more of the teachings of the present disclosure is described, followed by a description of various possible implementations of processes for data brokering in accordance with various implementations of the present disclosure.

Exemplary Environment

Figure 1:
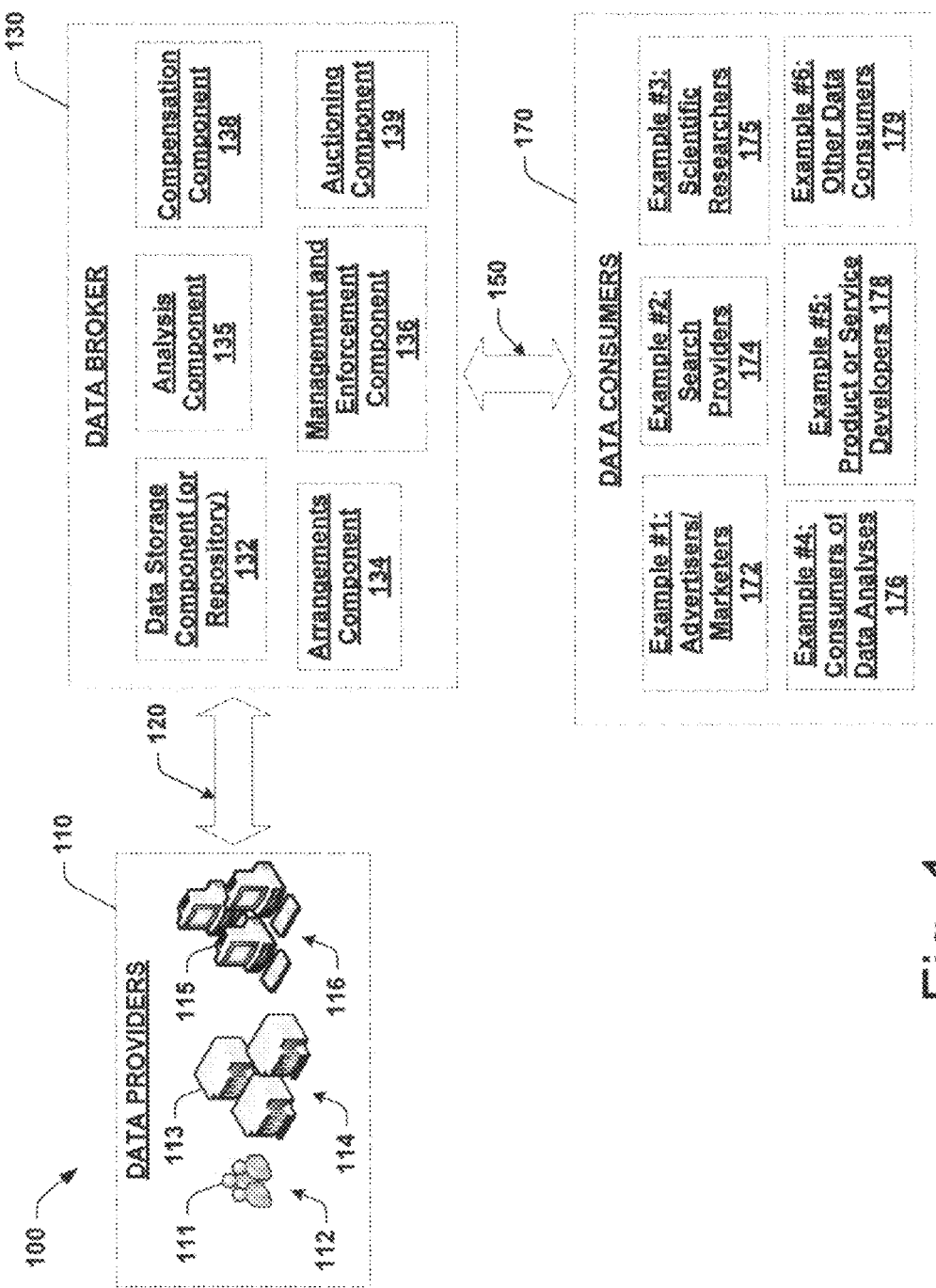
FIG. 1 is a schematic view of a representative environment for brokering data in accordance with an implementation of the present disclosure.

FIG. 1 is a schematic view of a representative environment 100 in accordance with an implementation of the present disclosure. In this implementation, the environment 100 includes one or more data providers 110, and one or more data consumers 170 who use the data generated by the data providers 110. In general, the data (or data products) generated by the data providers 110 may include a wide variety of information, including keywords, phrases, search terms, Universal Resource Locator (URL) data, browsing history, eye-balling history, time and quantity information, selection history, affinity-related information, health-related information, consumer-related information, personal-characteristic information, corporate (or other business entity) information, and any other suitable information.

The data providers 110 may include a variety of different providers and provider types. For example, in various implementations, the data providers 110 may include an individual 111, a group of individuals 112, an entity 113, a group of entities 114, a device 115, or a group of devices 116. In general, virtually any individual, entity, device, or groups thereof, may be a member of the data providers 110. For example, in various implementations, the individual 111 (or group of individuals 112) may include a computer user, consumer, person from a particular demographic group (e.g. age, gender, race, profession, religion, orientation, preference, geographic area, etc.), a particular bellwether or trendsetting individual (e.g. individual with popular ideas or tastes, athlete, performing artist, etc.), or any other suitable person.

Similarly, in various implementations, the entity 113 (or group of entities 114) may include a professional organization (e.g. Institute of Electrical and Electronics Engineers (IEEE), American Automobile Association (AAA), American Association of Retired Persons (AARP), etc.), company, university, union (e.g. United Auto Workers (UAW), International Affiliation of Writers Guilds, etc.), consumer group (e.g. members of Costco®, Sam's Club®, Starwood®, etc.), club, association, (e.g. Boy Scouts of America, etc.), or any other suitable type of entity. Also, in various implementations, the device 115 (or group of devices 116) may include, for example, a computer, networking device, processor, personal communication device, or any other suitable type of device. Of course, other individuals, entities, and devices that may serve as data providers 110 may be conceived. More specifically, in particular implementations, any individual, entity, or device whose data may serve as an indicator of future consumption may suitably qualify such individual, entity, or device as a data provider 110.

The data consumers 170 may also include a variety of different consumers and consumer types. For example, in some specific implementations, the data consumers 170 may include advertisers or marketers 172, search providers 174, scientific researchers 175, consumers of data analyses 176, product or service developers 178, or any other data consumers 179. Data consumers 170 may also include any and all of the individuals, entities, and devices (or groups thereof) referenced above as data providers 110, or any other suitable types of data consumers. It will be appreciated that the data providers 110 and the data consumers 170 are not necessarily mutually exclusive groups, and that an entity may in some instances be a data provider, and in other instances a data consumer, or may even be both at the same time.

As further shown in FIG. 1, a data broker 130 operatively communicates with the one or more data providers 110 and the one or more data consumers 170. In some implementations, the data broker 130 may include one or more components that are operable to perform various functions and operations associated with the data broker 130. For example, the data broker 130 may include a data storage component 132, an arrangements component 134, an analysis component 135, a management and enforcement component 136, a compensation component 138, and an auctioning component 139. It will be appreciated that the components of the data broker 130 shown in FIG. 1 are merely exemplary, and represent a possible implementation of the data broker 130. The functions and operations of the components 132-139 of the data broker 130 will be described more fully below with reference to FIGS. 3 through 9.

In the implementation shown in FIG. 1, the various components 132-139 of the data broker 130 may communicate and exchange information as needed to perform the functions and operations described herein. In various implementations, each of the components 132-139 may be implemented using software, hardware, firmware, or any suitable combinations thereof. It will be appreciated that in alternate implementations of the data broker 130, one or more of the components 132-139 of the data broker 130 may be combined, or may be divided or separated into additional components, or additional components may be added, or one or more of the components 132-139 may simply be eliminated, depending upon the particular requirements or specifications of the operating environment. An exemplary computing device 200 for carrying out one or more of the functions and operations of the environment 100 is described in the following section.

Exemplary Computing Device

Figure 2:
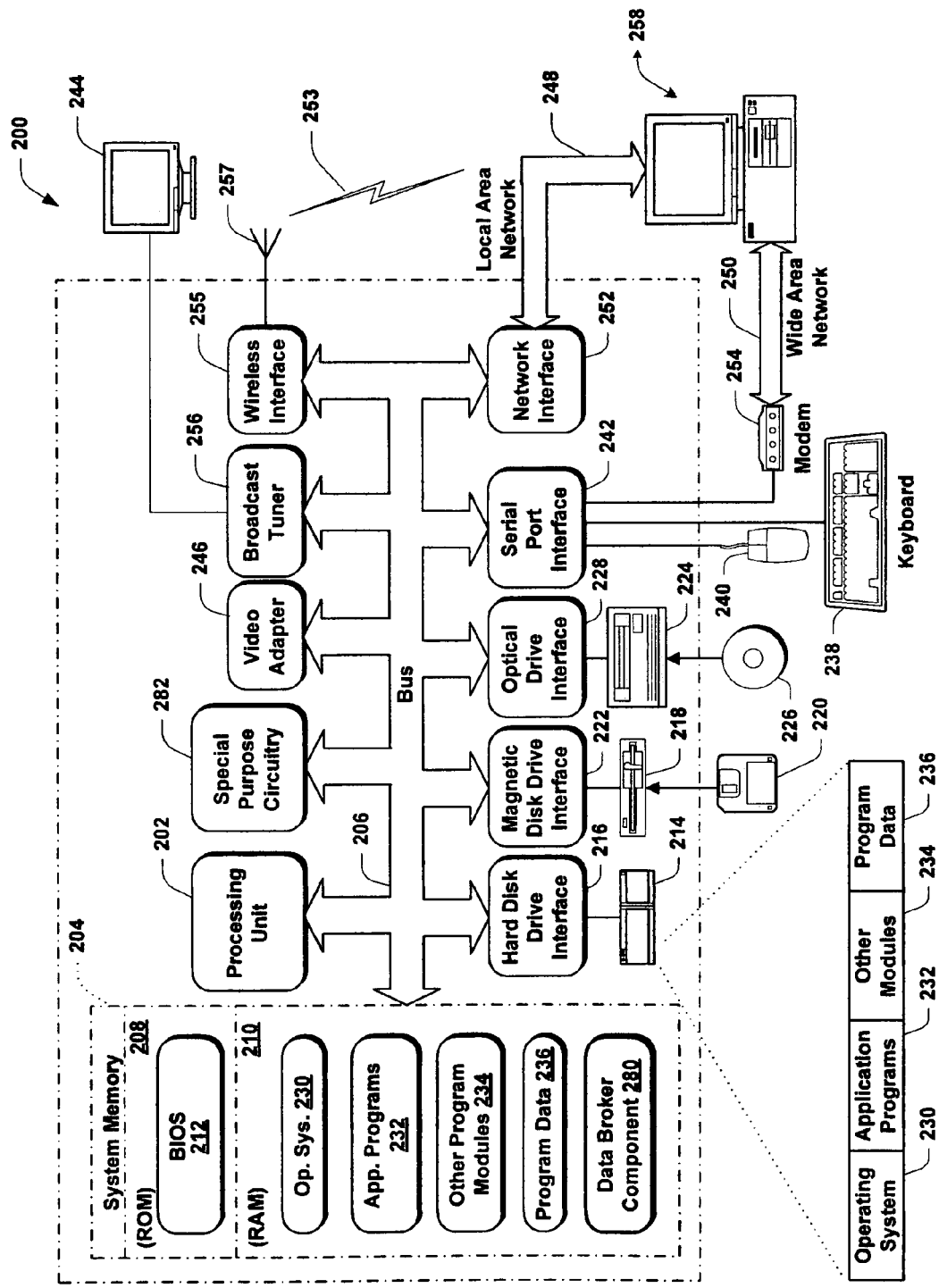
FIG. 2 is a schematic view of an exemplary computing device configured to operate in accordance with another implementation of the present disclosure.

In some implementations, one or more of the components of the exemplary environment 100 shown in FIG. 1 may be at least partially implemented using a computing device. For example, FIG. 2 is a schematic view of an exemplary computing device 200 configured to operate in accordance with an implementation of the present disclosure. As described below, the computing device 200 can be configured to perform one or more of the functions and operations associated with the environment 100 shown in FIG. 1, and more specifically, one or more of the functions and operations associated with the data broker 130, or the one or more components 132-139 of the data broker 130.

As shown in FIG. 2, in some implementations, the computing device 200 may include one or more processors (or processing units) 202, special purpose circuitry 282, a memory 204, and a bus 206 that couples various system components including the memory 204 to the one or more processors 202 and special purpose circuitry 282. The bus 206 represents one or more of any of several types of bus structures, including a memory bus or memory controller, a peripheral bus, an accelerated graphics port, and a processor or local bus using any of a variety of bus architectures. In this implementation, the memory 204 includes read only memory (ROM) 208 and random access memory (RAM) 210. A basic input/output system (BIOS) 212, containing the basic routines that help to transfer information between elements within the computing device 200, such as during start-up, is stored in ROM 208.

The exemplary computing device 200 further includes a hard disk drive 214 for reading from and writing to a hard disk (not shown), and is connected to the bus 206 via a hard disk driver interface 216 (e.g., a SCSI, ATA, or other type of interface). A magnetic disk drive 218 for reading from and writing to a removable magnetic disk 220, is connected to the system bus 206 via a magnetic disk drive interface 222. Similarly, an optical disk drive 224 for reading from or writing to a removable optical disk 226 such as a CD ROM, DVD, or other optical media, connected to the bus 206 via an optical drive interface 228. The drives and their associated computer-readable media provide nonvolatile storage of computer readable instructions, data structures, program modules and other data for the computing device 200. Although the exemplary computing device 200 described herein employs a hard disk, a removable magnetic disk 220 and a removable optical disk 226, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 2, a number of program modules may be stored on the memory 204 (e.g. the ROM 208 or the RAM 210) including an operating system 230, one or more application programs 232, other program modules 234, and program data 236. Alternately, these program modules may be stored on other computer-readable media, including the hard disk, the magnetic disk 220, or the optical disk 226. For purposes of illustration, programs and other executable program components, such as the operating system 230, are illustrated in FIG. 2 as discrete blocks, although it is recognized that such programs and components reside at various times in different storage components of the computing device 200, and may be executed by the processor(s) 202 or the special purpose circuitry 282 of the computing device 200.

A user may enter commands and information into the computing device 200 through input devices such as a keyboard 238 and a pointing device 240. Other input devices (not shown) may include a microphone, joystick, game pad, satellite dish, scanner, or the like. These and other input devices are connected to the processing unit 202 and special purpose circuitry 282 through an interface 242 that is coupled to the system bus 206. A monitor 244 or other type of display device is also connected to the bus 206 via an interface, such as a video adapter 246. In addition to the monitor, the computing device 200 may also include other peripheral output devices (not shown) such as speakers and printers.

The computing device 200 may operate in a networked environment using logical connections to one or more remote computers (or servers) 258, such as those operated by one or more of the data providers 110 and data consumers 170 shown in FIG. 1. Such remote computers (or servers) 258 may be a personal computer, a server, a router, a network PC, a peer device or other common network node, and may include many or all of the elements described above relative to computing device 200. The logical connections depicted in FIG. 2 (and in FIG. 1) may include one or more of a local area network (LAN) 248 and a wide area network (WAN) 250. Such networking environments are commonplace in offices, enterprise-wide computer networks, intranets, and the Internet. In this embodiment, the computing device 200 also includes one or more broadcast tuners 256. The broadcast tuner 256 may receive broadcast signals directly (e.g., analog or digital cable transmissions fed directly into the tuner 256) or via a reception device (e.g., via an antenna, a satellite dish, etc.).

When used in a LAN networking environment, the computing device 200 may be connected to the local network 248 through a network interface (or adapter) 252. When used in a WAN networking environment, the computing device 200 typically includes a modem 254 or other means for establishing communications over the wide area network 250, such as the Internet. The modem 254, which may be internal or external, may be connected to the bus 206 via the serial port interface 242. Similarly, the computing device 200 may exchange (send or receive) wireless signals 253 with one or more remote computers (or servers) 258, such as those operated by one or more of the data providers 110 and data consumers 170, using a wireless interface 255 coupled to a wireless communicator 257 (e.g., an antenna, a satellite dish, a transmitter, a receiver, a transceiver, a photoreceptor, a photodiode, an emitter, a receptor, etc.).

In a networked environment (e.g. environment 100 of FIG. 1), program modules depicted relative to the computing device 200, or portions thereof, may be stored in the memory 204, or in a remote memory storage device. More specifically, as further shown in FIG. 2, a data broker component 280 may be stored in the memory 204 of the computing device 200. The data broker component 280 may include an implementation of the data broker 130 of FIG. 1, or one or more components 132-139 of the data broker 130. The data broker component 280 may be implemented using software, hardware, firmware, or any suitable combinations thereof. In cooperation with the other components of the computing device 200, such as the processing unit 202 or the special purpose circuitry 282, the data broker component 280 may be operable to perform one or more implementations of processes for data brokering in accordance with the present disclosure. More specifically, the computing device 200 may be operable to perform one or more implementations of methods of brokering data, as described more fully below.

Exemplary Processes for Data Brokering

Exemplary processes for brokering data regarding a data provider's search-related activities will now be described. For convenience, and to facilitate an understanding of these processes, the exemplary processes will be described with reference to the exemplary environment 100 and exemplary computing device 200 described above.

Referring again to FIG. 1, communications (or interactions) 120 may be exchanged between the data broker 130 and the one or more data providers 110. Such communications 120 may be exchanged via any suitable communications systems. For example, in some implementations the communications 120 may be exchanged via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems. Further, the communications 120 may be accomplished using any suitably operable couplings between the data broker 130 and the one or more data providers 110, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using one or more components of the computing device 200, such as the network interface 252, the wireless interface 255, the serial port interface 242, or any other suitable components (e.g. interfaces 216, 222, 228).

The communications 120 may include, for example, negotiation activities (e.g. offers, rejections, counteroffers, terms, conditions, provisions, etc.) which may lead to the establishment of one or more data provision agreements between the data providers 110 and the data broker 130. The communications 120 may also include communications relating to performance of established data provision agreements, including, for example, data transmissions, data receptions, access records, compensation exchanges, accounting exchanges, or any other suitable communications (or interactions) relating to data brokering.

Similarly, communications (or interactions) 150 between the data broker 130 and the one or more data consumers 170 may include, for example, negotiation activities (e.g. offers, rejections, counteroffers, terms, conditions, provisions, etc.) which may lead to the establishment of one or more data use agreements between the data providers 110 and the data broker 130. Also, the communications 150 may include communications relating to performance of established data use agreements, including, for example, data transmissions, data receptions, access records, compensation exchanges, accounting exchanges, or any other suitable communications (or interactions) relating to data brokering.

Again, such communications 150 may be exchanged via any suitable communications systems. For example, in some implementations the communications 150 may be exchanged via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems. Further, the communications 150 may be accomplished using any suitably operable couplings between the data broker 130 and the one or more data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using one or more components of the computing device 200, such as the network interface 252, the wireless interface 255, the serial port interface 242, or any other suitable components (e.g. interfaces 216, 222, 228).

As noted above, the data broker 130 may include one or more components that are operable to perform various functions and operations associated with the data broker 130. More specifically, in the exemplary implementation of the data broker 130 shown in FIG. 1, the data broker 130 includes a data storage component or repository 132, an arrangements component 134, an analysis component 135, a management and enforcement component 136, a compensation component 138, and an auctioning component 139. Of course, in alternate implementations, one or more of these components 132-139 may be combined, separated into additional components, or eliminated, or additional components may be added, depending upon the particular requirements or specifications of the operating environment.

Various exemplary functionalities of the components 132-139 of the exemplary data broker 130 will now be described. It should be appreciated that the exemplary functionalities described below may be desirable in some implementations but not in others, and that unless otherwise specified, such exemplary functionalities are non-essential, and may be varied or omitted depending upon the desired operating characteristics of the implementation, or the particular requirements or specifications of the operating environment.

In some implementations, the data storage component 132 may be operable to receive and store data provided by the data providers 110. For example, in some implementations, the data provided by the data providers 110 may be included as part of the communications 120 described above. Furthermore, the data provided by the data providers 110 may be provided in any suitable form, including electrical signals, optical signals, acoustic signals, electromagnetic signals, modulated signals (e.g. frequency or amplitude modulated signals, etc.), binary signals, tabulated data, data records, data summaries, or any other suitable forms, and may be provided using any suitable communication media, including physical media (e.g. wires, cables, optical connectors, CD's, DVD's, printed or written data, etc.) non-physical transmission media (e.g. wireless transmissions), or any other suitable communication systems or methods.

The data storage component 132 may organize the data by type, profile, data provider, value, or using any other suitable organizational structure. In some implementations, the data storage component 132 may perform verification activities, including monitoring and analyzing incoming data to ensure verity (e.g. accuracy, authenticity, etc.) of the information provided by the data providers 110.

In some implementations, the data storage component 132 stores additional information relating to the communications 120, 150 between the data broker 130 and the data providers 110 and the data consumers 170. For example, the data storage component 132 may store information relating to the functions and operations of any of the other components 134-139 of the data broker 130, including, for example, negotiation activities (e.g. offers, rejections, counteroffers, terms, conditions, provisions, etc.), established data provision agreements and data use agreements (e.g. terms and conditions regarding access, compensation, privacy, quality, quantity, usage, rights and restrictions, etc.), and information relating to performance of such established agreements (e.g. data transmissions, data receptions, access records, compensation exchanges, accounting exchanges, etc.). Various aspects of possible functions and operations of the other components 134-139 of the data broker 130 that may be stored within the data storage component 132 are described below.

Similarly, the arrangements component 134 may be operable to perform a variety of functions and operations associated with the data broker 130 via the communications 120, 150 between the data broker 130 and the data providers 110 and the data consumers 170. For example, in some implementations, the arrangements component 134 may be operable to perform negotiations of data brokering arrangements, including one or more of data provision agreements with data providers 110, or data use agreements with data consumers 170.

More specifically, in some implementations, the arrangements component 134 may be operable to create proposals, propose terms, receive offers to provide data, receive offers to consume data, receive requests for data analyses, identify potential data providers, identify potential data consumers, and perform other functions and operations associated with making arrangements with the data providers 110, the data consumers 170, or both. Additional aspects of data brokering that may be negotiated or performed by the arrangements component 134 are described below with reference to FIGS. 3 through 9.

The analysis component 135 (FIG. 1) may also be operable to perform a variety of functions and operations associated with the data broker 130. For example, the analysis component 135 may be operable to perform an analysis or simulation using one or more components of the computing device 200 (e.g. the processing unit 202, the special purpose circuitry 282, the memory 204, the application programs 232, the program modules 234, the program data 236, etc.).

More specifically, in some implementations, the analysis component 135 may be operable to perform a desired analysis or simulation in response to a request by one or more of the data consumers 170 (or the data providers 110, or the data broker 130), such as to test a theory, to determine a potential value of data, to develop or validate a new model or hypothesis, to filter or glean relevant data from a quantity of raw data, or to perform any other suitable analysis or simulation. For example, the analysis component 135 may, at the request of one or more of the data consumers 170 (or the data providers 110, or the data broker 130) perform desired analyses or simulations, including mathematical manipulations of the data (e.g. interpolations, extrapolations, correlations, data fitting analyses, linear regressions, mathematical combinations, statistical analyses, Fourier analyses, Bayesian analyses, time-series analyses, etc.), model validation activities, model test activities, model development activities of suitable models (e.g. marketing models, consumption models, business models, economic models, etc.) that may use the data provided by the data providers 110.

The management and enforcement component 136 (FIG. 1) may be operable to monitor a performance of one or more of the data providers 110, the data broker 130, and the data consumers 170, in accordance with the arrangements established by the arrangements component 134. In some implementations, the management and enforcement component 136 may monitor performance by analyzing the communications 120 between the data providers 110 and the data broker 130, or the communications 150 between the data broker 130 and the data consumers 170. In other implementations, the management and enforcement component 136 may monitor the operations of one or more of the other components of the data broker 130 (e.g. the data storage component 132, the analysis component 135, the compensation component 138, etc.).

More specifically, the management and enforcement component 136 may perform one or more monitoring functions (e.g. access requests, traffic volumes, access periods, access volumes, consumer and provider identities, hits, usage rates, provision rates, etc.), recordkeeping functions (e.g. access requests, traffic volumes, access periods, access volumes, consumer and provider identities, hits, usage rates, provision rates, etc.), access control functions (e.g. data rights management, license terms, restrictions on usage, privacy and confidentiality provisions, etc.), notification functions including transmitting alerts, warnings, reminders, and notices regarding terms and conditions of data brokering agreements (e.g. usage rates and limits, provision rates and limits, spending rates and limits, quality assurance, usage restrictions, privacy restrictions, etc.), or any other suitable functions in accordance with the terms and conditions of the agreements established between the parties.

The functions and operations of the management and enforcement component 136 may be performed using software (e.g. traffic monitoring software, speed monitoring software, transfer rates recorder, bandwidth usage software, keystroke monitoring, etc.) that monitors, records, or captures upload and download activities (e.g. at one or more interfaces of a computing device 200, at the processor 202, at the memory 204, etc.), hardware (e.g. counters, meters, network cards, circuitry, etc.), firmware, or any suitable combination thereof.

With continued reference to FIG. 1, the compensation component 138 may be operable to determine the various amounts of compensation due from one or more of the data consumers 170, or to determine the various amounts of compensation owing to on or more of the data providers 110, or both. For example, the compensation component 138 may be operable to determine compensation due or owing using one or more components of the computing device 200 (e.g. the processing unit 202, the special purpose circuitry 282, the memory 204, the application programs 232, the program modules 234, the program data 236, etc.).

In some implementations, the compensation component 138 may receive instructions or information to be used in determining compensation due or owing from one or more other components of the data broker 130. For example, in some implementations, the compensation component 138 may receive terms or instructions regarding compensation established by the arrangements component 134 (or the auctioning component 139). Similarly, the compensation component 138 may receive performance information from one or more other components of the data broker 130, including performance information from the management and enforcement component 136, the data storage component 132, the analysis component 135, or any other suitable component. In further implementations, the compensation component 138 may be operable to manage and implement a variety of compensation types, including upfront compensation, future compensation, contingent or conditional compensation, royalty-based compensation, auctioning-based compensation, non-monetary compensation, or any other suitable types of compensation. The compensation determined by the compensation component 138 may be provided by one or more of the communications 120 between the data providers 110 and the data broker 130, or the communications 150 between the data broker 130 and the data consumers 170.

The auctioning component 139 (FIG. 1) may be operable to perform functions and operations associated with the auctioning of data. For example, in some implementations, the auctioning component 139 may function in a manner substantially similar to the arrangements component 134, but may be operable to do so in an auctioning format. The auctioning component 139 may be operable to perform a variety of functions and operations associated with the data broker 130 via the communications 120, 150 between the data broker 130 and the data providers 110 and the data consumers 170. For example, in some implementations, the auctioning component 139 may be operable to perform negotiations of data brokering arrangements, including one or more of arranging or negotiating data provision agreements with data providers 110 via the communications 120, or arranging or negotiating data use agreements with data consumers 170 via the communications 150.

In some implementations, the auctioning component 139 may be operable to offer data products to a plurality of potential data consumers, to receive bids for use of the data, to evaluate the bids, to negotiate the terms and conditions, and to perform any other suitable auction-related functions. The auctioning component 139 may also be configured to create proposals, propose terms, receive offers to provide data, receive offers to consume data, receive requests for data analyses, identify potential data providers, identify potential data consumers, perform negotiations of one or more of data provision agreements and data use agreements, and perform other functions and operations associated with making arrangements with the data providers 110 and the data consumers 170.

Additional aspects of data brokering processes in accordance with various possible implementations of the present disclosure will now be described with reference to FIGS. 3 through 9. For ease of understanding, the flowcharts are organized such that the initial flowchart (FIG. 3) presents an overall "big picture" viewpoint, and thereafter the following flowcharts present possible particular implementations and/or expansions of the "big picture" flowcharts as either substeps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 3:
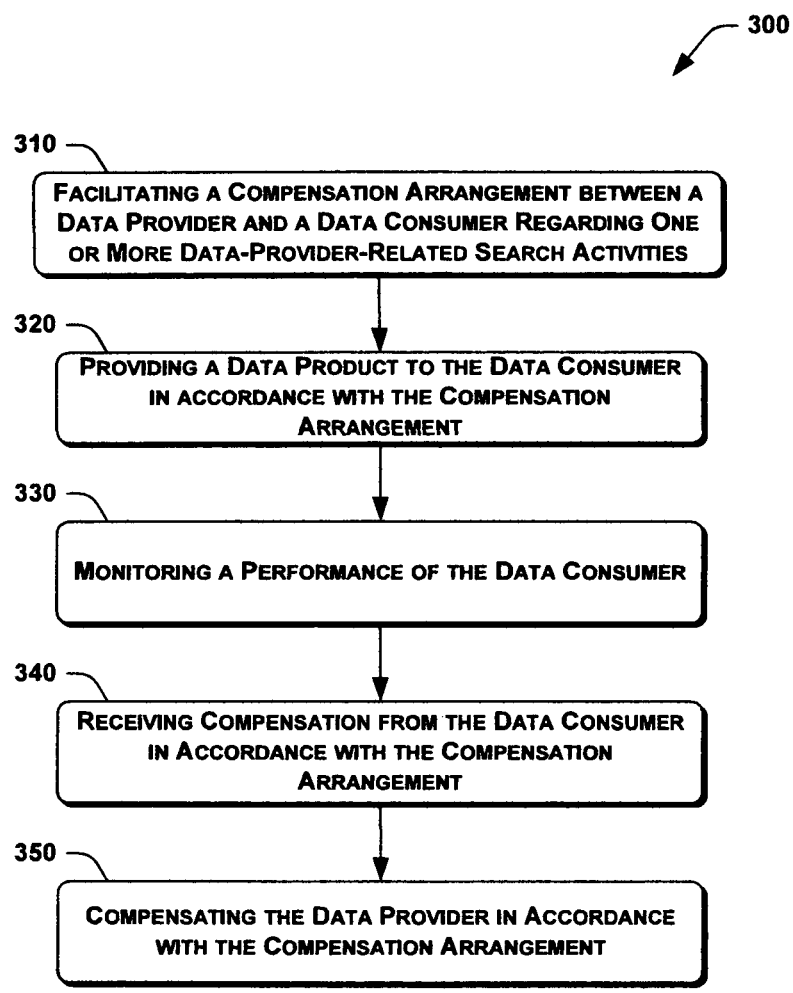
FIG. 3 is a flowchart of a method of brokering data in accordance with another implementation of the present disclosure.

FIG. 3 is a flowchart of a method of brokering data 300 in accordance with another implementation of the present disclosure. In this implementation, the method 300 includes facilitating a compensation arrangement between a data provider and a data consumer regarding one or more data-provider-related search activities at 310. Generally, facilitating a compensation arrangement between a data provider and a data consumer regarding one or more data-provider-related search activities (at 310) may be accomplished using the communications 120 between the data providers 110 and the data broker 130, or the communications 150 between the data broker 130 and the data consumer 170, or both. Additionally, in some implementations, facilitating a compensation arrangement between a data provider and a data consumer regarding one or more data-provider-related search activities (at 310) may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems.

Furthermore, facilitating a compensation arrangement between a data provider and a data consumer regarding one or more data-provider-related search activities (at 310) may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more components of such devices (e.g. processors 202, special purpose circuitry 282, application programs 232, other program modules 234, program data 236, network interface 252, wireless interface 255, serial port interface 242, other interfaces 216, 222, 228, etc.). In some implementations, facilitating a compensation arrangement between a data provider and a data consumer regarding one or more data-provider-related search activities (at 310) may be performed by the data broker 130, or more specifically by one or more components of the data broker 130 (e.g. the arrangements component 134, the auctioning component 139, etc.).

At 320, the method 300 includes providing a data product to the data consumer in accordance with the compensation arrangement. Generally, providing a data product to the data consumer in accordance with the compensation arrangement (at 320) may be accomplished using the communications 120 between the data providers 110 and the data broker 130, the communications 150 between the data broker 130 and the data consumers 170, or both. Additionally, in some implementations, providing a data product to the data consumer in accordance with the compensation arrangement (at 320) may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems.

Furthermore, providing a data product to the data consumer in accordance with the compensation arrangement (at 320) may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more components of such devices (e.g. processors 202, special purpose circuitry 282, application programs 232, other program modules 234, program data 236, network interface 252, wireless interface 255, serial port interface 242, other interfaces 216, 222, 228, etc.). In some implementations, providing a data product to the data consumer in accordance with the compensation arrangement may be performed by the data broker 130, or more specifically, by one or more components of the data broker 130 (e.g. the data storage component 132, the arrangements component 134, the management and enforcement component 136, the auctioning component 139, etc.).

As further shown in FIG. 3, in some implementations, the method 300 may include monitoring a performance of the data consumer at 330. Generally, monitoring a performance of the data consumer (at 330) may be performed using software (e.g. traffic monitoring software, speed monitoring software, transfer rates recorder, bandwidth usage software, keystroke monitoring, etc.) that monitors, records, or captures upload and download activities (e.g. at one or more interfaces of a computing device 200, at the processor 202, at the memory 204, etc.), hardware (e.g. counters, meters, network cards, circuitry, etc.), firmware, or any suitable combination thereof. More specifically, monitoring a performance of the data consumer (at 330) may include one or more of monitoring (e.g. access requests, traffic volumes, access periods, access volumes, consumer and provider identities, hits, usage rates, provision rates, etc.), recordkeeping (e.g. access requests, traffic volumes, access periods, access volumes, consumer and provider identities, hits, usage rates, provision rates, etc.), access control (e.g. data rights management, license terms, restrictions on usage, privacy and confidentiality provisions, etc.), notification (e.g. transmitting alerts, warnings, reminders, notices, rates and limits, quality assurance, restrictions, etc.), capturing, or any other suitable functions in accordance with the terms and conditions of one or more of the agreements established between the parties.

In some implementations, monitoring a performance of the data consumer (at 330) may be accomplished using the communications 120 between the data providers 110 and the data broker 130, the communications 150 between the data broker 130 and the data consumers 170, or both. In other implementations, monitoring a performance of the data consumer (at 330) may be accomplished by monitoring one or more of the other components of the data broker 130, such as, for example, the data storage component 132, the analysis component 135, the compensation component 138, or any other suitable components.

Additionally, monitoring a performance of the data consumer (at 330) may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems, and may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more components of such devices (e.g. processors 202, special purpose circuitry 282, application programs 232, other program modules 234, program data 236, network interface 252, wireless interface 255, serial port interface 242, other interfaces 216, 222, 228, etc.).

At 340, the method 300 may include receiving compensation from the data consumer in accordance with the compensation arrangement. In some implementations, receiving compensation from the data consumer in accordance with the compensation arrangement (at 340) may be accomplished using electronic (wire or wireless) transfers of funds, electronic payments, credits and debit transactions, transmittals of checks or other negotiable instruments, or any other suitable methods of compensation exchange. In some implementations, receiving compensation from the data consumer in accordance with the compensation arrangement (at 340) may be accomplished using the communications 150 between the data broker 130 and the data consumers 170. More specifically, the compensation may be received from the data consumer by the data broker 130, or by one or more components of the data broker 130 (e.g. the management and enforcement component 136, the compensation component 138, the arrangements component 134, the auctioning component 139, or any other suitable component).

Additionally, receiving compensation from the data consumer in accordance with the compensation arrangement (at 340) may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems, and may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more components of such devices (e.g. processers 202, special purpose circuitry 282, application programs 232, other program modules 234, program data 236, network interface 252, wireless interface 255, serial port interface 242, other interfaces 216, 222, 228, etc.).

At 350, the method 300 may include compensating the data provider in accordance with the compensation arrangement. Again, in some implementations, compensating the data provider in accordance with the compensation arrangement (at 350) may be accomplished using electronic (wire or wireless) transfers of funds, electronic payments, credits and debit transactions, transmittals of checks or other negotiable instruments, or any other suitable methods of compensation exchange. In some implementations, compensating the data provider in accordance with the compensation arrangement (at 350) may be accomplished using the communications 120 between the data broker 130 and the data providers 110. More specifically, the compensation may be provided to the data provider by the data broker 130, or by one or more components of the data broker 130 (e.g. the management and enforcement component 136, the compensation component 138, the arrangements component 134, the auctioning component 139, or any other suitable component).

Additionally, compensating the data provider in accordance with the compensation arrangement (at 350) may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems, and may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more components of such devices (e.g. processers 202, special purpose circuitry 282, application programs 232, other program modules 234, program data 236, network interface 252, wireless interface 255, serial port interface 242, other interfaces 216, 222, 228, etc.).

It will be appreciated that the facilitating a compensation arrangement between a data provider and a data consumer regarding one or more data-provider-related search activities (at 310) of the method 300 of FIG. 3, may be implemented in a variety of ways. For example, FIGS. 4 through 9 are flowcharts of various possible implementations of facilitating a compensation arrangement between a data provider and a data consumer regarding one or more data-provider-related search activities that provide for data tracking components.

Figure 4:
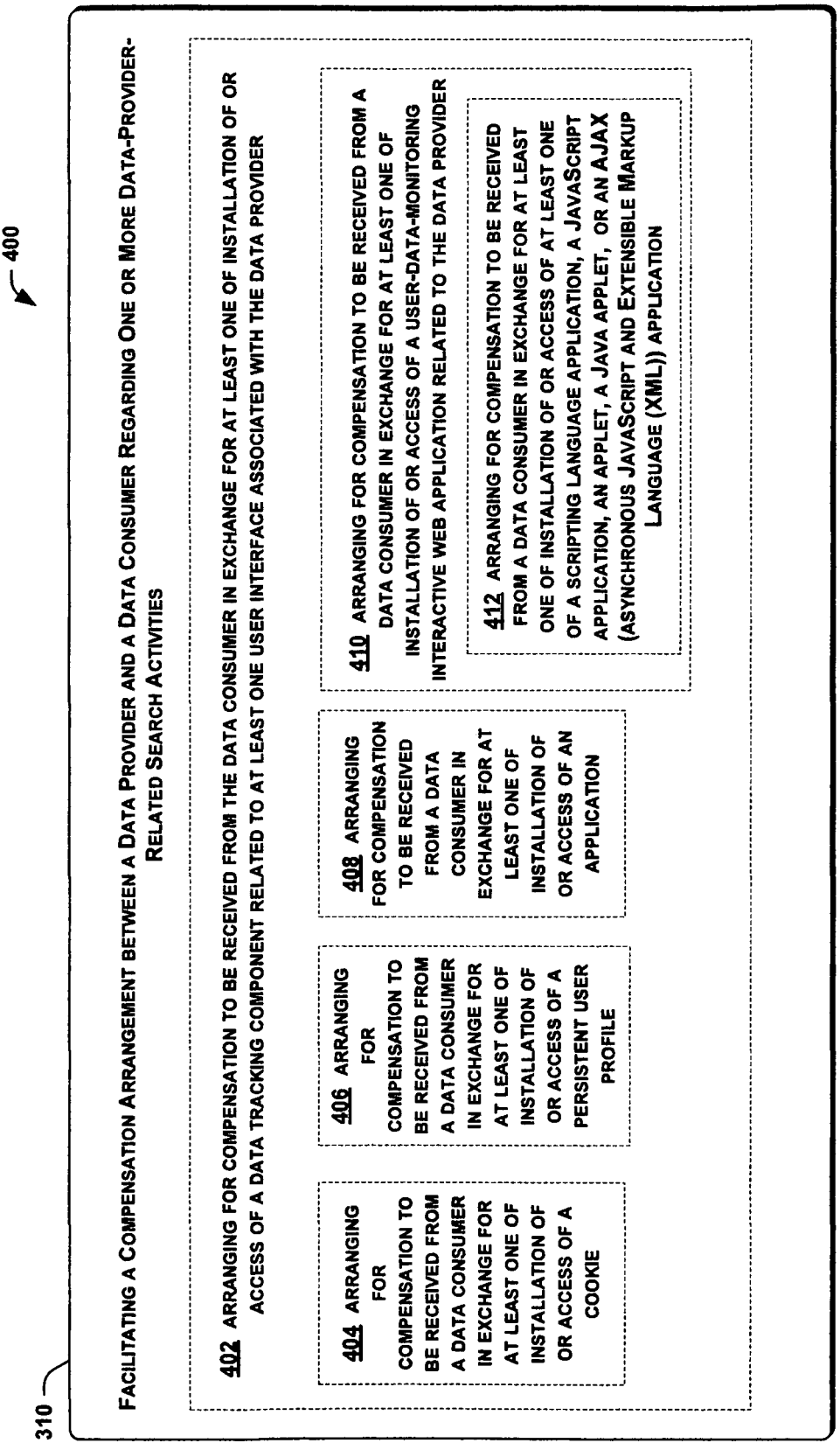

In an implementation 400 shown in FIG. 4, facilitating a compensation arrangement between a data provider and a data consumer regarding one or more data-provider-related search activities (at 310 of FIG. 3) may include arranging for compensation to be received from the data consumer in exchange for at least one of installation of or access of a data tracking component related to at least one user interface associated with the data provider at 402. In some implementations, arranging for compensation to be received from the data consumer in exchange for at least one of installation of or access of a data tracking component related to at least one user interface associated with the data provider (at 402) may be accomplished through a variety of computer tracking and surveillance techniques.

For example, in some implementations, surveillance software applications, including commercially-available software applications (e.g. products from Spectorsoft Corp., IdeaTalent, LLC, Microsoft® BizTalk Server Toolkit, etc.) or customized software applications, may be installed on a data provider's computing device that monitor and record a data provider's activities (e.g. interaction history, machine state, Web interactions, keylogging, screenshots, text messages, emails, etc.). In other implementations, arranging for compensation to be received from the data consumer in exchange for at least one of installation of or access of a data tracking component related to at least one user interface associated with the data provider (at 402) may be accomplished by monitoring of data traffic into and out of a computer or network (e.g. using "packet sniffing") without actually being installed on a data provider's computing device. For example, packet sniffing may include receiving data transmissions (e.g. along a portion of a LAN, WAN, intranet, internet, etc.) from a data provider that are bound for another destination, and processing those data transmissions to determine information regarding a data provider's activities. One example of a suitable packet sniffing monitoring application is the "Carnivore" system implemented by the U.S. Federal Bureau of Investigation.

In other implementations, arranging for compensation to be received from the data consumer in exchange for at least one of installation of or access of a data tracking component related to at least one user interface associated with the data provider (at 402) may be accomplished through detection and analysis of emanations (e.g. electrical energy, acoustical energy, magnetic-field radiation, electric-field radiation, line conduction, acoustic emissions etc.) which disclose information transmitted, received, handled, or otherwise processed by a computer or any other information-processing equipment. Such detection and analysis of emanations may also include those surveillance technologies generally referred to as "TEMPEST" technologies.

In other implementations, arranging for compensation to be received from the data consumer in exchange for at least one of installation of or access of a data tracking component related to at least one user interface associated with the data provider (at 402) may be accomplished using physical (hardware) surveillance devices (or "bugs"). For example, some physical surveillance devices may detect, record, or broadcast a data provider's activities (e.g. a keystroke logger implanted in circuitry inside a keyboard, devices inserted portions of a computing device, video cameras, sensors, detectors, etc.).

As further shown in FIG. 4, in some implementations, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of a cookie at 404. As used herein, the term "cookies" generally refers to parcels of data (e.g. that may be sent by a server to a web client, such as a browser), which can be used for tracking a data provider's activities (e.g. browsing behavior, session tracking, state maintenance, etc.), and maintaining specific user-related information (e.g. site preferences, contents of electronic shopping carts, etc.).

In other implementations, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of a persistent user profile at 406. A persistent user profile may include information regarding a user of a computer that is stored, for example, by an operating system (e.g. Windows XP Professional, etc.) and which can be used for tracking a data provider's activities.

In further implementations, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of an application at 408. As noted above, exemplary applications suitable for this purpose may include commercially-available software applications (e.g. products from Spectorsoft Corp., IdeaTalent, LLC, Microsoft® BizTalk Server Toolkit, etc.) or customized software applications, and may be installed on a data provider's computing device that monitor and record a data provider's activities (e.g. interaction history, machine state, Web interactions, keylogging, screenshots, text messages, emails, etc.).

In still other implementations, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of a user-data-monitoring interactive web application related to the data provider at 410. Again, as noted above, exemplary user-data-monitoring interactive web applications suitable for this purpose may include commercially-available software applications (e.g. products from Spectorsoft Corp., IdeaTalent, LLC, Microsoft® BizTalk Server Toolkit, etc.) or customized software applications, and may be installed on a data provider's computing device that monitor and record a data provider's activities (e.g. interaction history, machine state, Web interactions, keylogging, screenshots, text messages, emails, etc.). Additionally, such user-data-monitoring interactive web applications may monitor data traffic into and out of a computer or network using "packet sniffing" (e.g. "Carnivore") without actually being installed on a data provider's computing device.

More specifically, arranging for compensation to be received from a data consumer in exchange for at least one of installation of or access of a user-data-monitoring interactive web application related to the data provider (at 410) may include arranging for compensation to be received from a data consumer in exchange for at least one of installation of or access of at least one of a scripting language application, a JavaScript application, an applet, a Java applet, or an AJAX (asynchronous JavaScript and Extensible Markup Language (XML)) application at 412. Of course, in further implementations, additional embodiments of user-data-monitoring interactive web applications may be conceived.

It will be appreciated that data tracking components may be provided, implemented, or positioned in any suitable locations within the environment 100. For example, as shown in FIG. 5, in an implementation 430, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of a data tracking component loaded on a machine associated with a specific user at 432. As noted above, in some implementations, a variety of surveillance software applications may be installed onto a data provider's machine (e.g. computing device, server, communication equipment, etc.). Additionally, in other implementations, surveillance devices (e.g. bugs) can be installed onto a data provider's machine (e.g. computing device, keyboard, etc.).

Similarly, in some implementations, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of a data tracking component loaded on a machine associated with a specific user's employer at 434. Again, in some implementations, a variety of surveillance software applications and surveillance devices may be installed onto a machine (e.g. computing device, server, communication equipment, keyboard, etc.).

In further implementations, arranging for compensation to be received from the data consumer in exchange for at least one of installation of or access of a data tracking component related to at least one user interface associated with the data provider (at 402) may include arranging for compensation to be received from a data consumer in exchange for at least one of installation of or access of a data tracking component configured to monitor an aspect of the data provider's activities at 436. For example, in some implementations, arranging for compensation to be received from a data consumer in exchange for at least one of installation of or access of a data tracking component configured to monitor an aspect of the data provider's activities (at 436) may include arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity at 438. As noted above, in some implementations, applications or devices may be installed on a data provider's computing device to monitor and record a data provider's activities (e.g. interaction history, machine state, Web interactions, keylogging, screenshots, text messages, emails, etc.), or by accessing information stored on a data provider's computing device (e.g. cookies, persistent user profile, etc.), or by remotely monitoring a data provider's activities using, for example, packet sniffing, monitoring devices (e.g. video cameras, sensors, etc.), or through detection and analysis of emanations (e.g. electrical energy, acoustical energy, magnetic-field radiation, electric-field radiation, line conduction, acoustic emissions etc).

As further shown in FIG. 5, in some implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor an affinity-related activity including at least one of a sports affinity activity, a religious affinity activity, a music affinity activity, a literature affinity activity, a theater affinity activity, a film affinity activity, a television program affinity activity, a hobby affinity activity, a service affinity activity, or a product affinity activity at 440. As noted above, in some implementations, applications or devices may be installed on a data provider's computing device to monitor and record a data provider's activities (e.g. interaction history, machine state, Web interactions, keylogging, screenshots, text messages, emails, etc.), or by accessing information stored on a data provider's computing device (e.g. cookies, persistent user profile, etc.), or by remotely monitoring a data provider's activities using, for example, packet sniffing, monitoring devices (e.g. video cameras, sensors, etc.), or through detection and analysis of emanations (e.g. electrical energy, acoustical energy, magnetic-field radiation, electric-field radiation, line conduction, acoustic emissions etc).

In other implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor an affinity-related activity and to pair an aspect of the affinity-related activity with an aspect of a profile of the data provider at 440. Similarly, in some implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor an affinity-related activity and to pair an aspect of the affinity-related activity with an aspect of a presumed profile of the data provider at 444. For example, in particular implementations, the affinity-related activities may be paired with one or more of the following possible aspects of the profile (actual or presumed) of the data provider: gender, age, education, race, geographic location, nationality, economic status, employment status, or any other suitable profile aspects.

With reference to FIG. 6, in another implementation 450, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a health-related activity including at least one of an ailment-related activity, a condition-related activity, a disease-related activity, a treatment-related activity, a prevention-related activity, a diet-related activity, an exercise-related activity, a mental-health related activity, or a wellness-related activity at 452. As noted above, in some implementations, applications or devices may be installed on a data provider's computing device to monitor and record a data provider's activities (e.g. interaction history, machine state, Web interactions, keylogging, screenshots, text messages, emails, etc.), or by accessing information stored on a data provider's computing device (e.g. cookies, persistent user profile, etc.), or by remotely monitoring a data provider's activities using, for example, packet sniffing, monitoring devices (e.g. video cameras, sensors, etc.), or through detection and analysis of emanations (e.g. electrical energy, acoustical energy, magnetic-field radiation, electric-field radiation, line conduction, acoustic emissions etc).

In further implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a health-related activity and to pair an aspect of the health-related activity with an aspect of a profile of the data provider at 454 Similarly, in some implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a health-related activity and to pair an aspect of the health-related activity with an aspect of a presumed profile of the data provider at 456. In particular implementations, for example, the health-related activities may be paired with one or more of the following possible aspects of the profile (actual or presumed) of the data provider: gender, age, education, race, geographic location, nationality, economic status, employment status, or any other suitable profile aspects.

As shown in FIG. 7, in an implementation 460, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a consumer-related activity including at least one of a purchasing-related activity, a spending-related activity, an income-related activity, a credit-worthiness-related activity, a subscription-related activity, an ordering-related activity, a shopping-related activity, a browsing-related activity, a credit card-related activity, a debit card-related activity, a check writing-related activity, a delivery-related activity, a coupon-related activity, a selling-method-related activity, an offering-related activity, a promotional-event-related activity, or an advertising-related activity at 462. As noted above, in some implementations, applications or devices may be installed on a data provider's computing device to monitor and record a data provider's activities (e.g. interaction history, machine state, Web interactions, keylogging, screenshots, text messages, emails, etc.), or by accessing information stored on a data provider's computing device (e.g. cookies, persistent user profile, etc.), or by remotely monitoring a data provider's activities using, for example, packet sniffing, monitoring devices (e.g. video cameras, sensors, etc.), or through detection and analysis of emanations (e.g. electrical energy, acoustical energy, magnetic-field radiation, electric-field radiation, line conduction, acoustic emissions etc).

In some implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a consumer-related activity and to pair an aspect of the consumer-related activity with an aspect of a profile of the data provider at 464 In further implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a consumer-related activity and to pair an aspect of the consumer-related activity with an aspect of a presumed profile of the data provider at 466. For example, in particular implementations, the consumer-related activities may be paired with one or more of the following possible aspects of the profile (actual or presumed) of the data provider: gender, age, education, race, geographic location, nationality, economic status, employment status, or any other suitable profile aspects.

With reference to FIG. 8, in another implementation 470, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a personal-characteristic-related activity including at least one of an age-related activity, a gender-related activity, a race-related activity, an income-related activity, a geographic location-related activity, a marital status-related activity, an education-related activity, an employment-related activity, a sexual orientation-related activity, a cultural-related activity, a personality characteristic-related activity, or a demographic-related activity at 472. As noted above, in some implementations, applications or devices may be installed on a data provider's computing device to monitor and record a data provider's activities (e.g. interaction history, machine state, Web interactions, keylogging, screenshots, text messages, emails, etc.), or by accessing information stored on a data provider's computing device (e.g. cookies, persistent user profile, etc.), or by remotely monitoring a data provider's activities using, for example, packet sniffing, monitoring devices (e.g. video cameras, sensors, etc.), or through detection and analysis of emanations (e.g. electrical energy, acoustical energy, magnetic-field radiation, electric-field radiation, line conduction, acoustic emissions etc).

In some implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a personal-characteristic-related activity and to pair an aspect of the personal-characteristic-related activity with an aspect of a profile of the data provider at 472. In further implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a personal-characteristic-related activity and to pair an aspect of the personal-characteristic-related activity with an aspect of a presumed profile of the data provider at 474. In particular implementations, for example, the personal-characteristic-related activities may be paired with one or more of the following possible aspects of the profile (actual or presumed) of the data provider: gender, age, education, race, geographic location, nationality, economic status, employment status, or any other suitable profile aspects.

As shown in FIG. 9, in yet another implementation 480, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a business entity-related activity including at least one of an employment-related activity, a management-related activity, a marketing-related activity, a sales-related activity, a plan-related activity, a profit-related activity, a loss-related activity, an asset-related activity, a liability-related activity, an inventory-related activity, and an overhead-related activity at 482. As noted above, in some implementations, applications or devices may be installed on a data provider's computing device to monitor and record a data provider's activities (e.g. interaction history, machine state, Web interactions, keylogging, screenshots, text messages, emails, etc.), or by accessing information stored on a data provider's computing device (e.g. cookies, persistent user profile, etc.), or by remotely monitoring a data provider's activities using, for example, packet sniffing, monitoring devices (e.g. video cameras, sensors, etc.), or through detection and analysis of emanations (e.g. electrical energy, acoustical energy, magnetic-field radiation, electric-field radiation, line conduction, acoustic emissions etc).

In some implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a business entity-related activity and to pair an aspect of the business entity-related activity with an aspect of a profile of the data provider at 482. In further implementations, arranging for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity (at 438) may include arranging for compensation to be received from a data consumer in exchange for at least one of installation of or access of a data tracking component configured to monitor a business entity-related activity and to pair an aspect of the business entity-related activity with an aspect of a presumed profile of the data provider at 484. In particular implementations, for example, the business entity-related activities may be paired with one or more of the following possible aspects of the profile (actual or presumed) of the data provider: gender, age, education, race, geographic location, nationality, economic status, employment status, or any other suitable profile aspects.

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A computer-implemented method, comprising:
    facilitating a compensation arrangement between a data provider and a data consumer regarding one or more data-provider-related search activities, wherein the facilitating the compensation arrangement between the data provider and the data consumer regarding the one or more data-provider-related search activities includes:
    a) arranging for compensation to be received from the data consumer in exchange for at least one of installation of or access of a data tracking component related to at least one user interface associated with the data provider, wherein the at least one of installation or access of the data tracking component includes at least one of installation or access of a data counter of data from the data tracking component; and
    b) performing an analysis to determine a potential value of the data, wherein the potential value is at least partially based on how the data is organized; and
    wherein at least one of the facilitating, arranging, or performing is at least partially implemented using one or more processing devices.

2. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for at least one of installation of or access of a cookie.

3. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for at least one of installation of or access of a persistent user profile.

4. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for at least one of installation of or access of an application.

5. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for at least one of installation of or access of a user-data-monitoring interactive web application related to the data provider.

6. The computer-implemented method of claim 5, wherein arranging for compensation to be received from the data consumer in exchange for at least one of installation of or access of a user-data-monitoring interactive web application related to the data provider comprises:
arranging for compensation to be received from the data consumer in exchange for at least one of installation of or access of at least one of a scripting language application, a JavaScript application, an applet, a Java applet, or an AJAX (asynchronous JavaScript and Extensible Markup Language (XML)) application.

7. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for the at least one of installation of or access of the data tracking component loaded on a machine associated with a specific user.

8. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for the at least one of installation of or access of the data tracking component loaded on a machine associated with a specific user's employer.

9. The computer-implemented method of claim 1, wherein arranging for compensation to be received from the data consumer in exchange for at least one of installation of or access of a data tracking component related to at least one user interface associated with the data provider comprises:
arranging for compensation to be received from the data consumer in exchange for the at least one of installation of or access of the data tracking component configured to monitor an aspect of the data provider's activities.

10. The computer-implemented method of claim 9, wherein arranging for compensation to be received from the data consumer in exchange for at least one of installation of or access of a data tracking component configured to monitor an aspect of the data provider's activities comprises:
arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity.

11. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:
arranging for compensation to be received from the data consumer in exchange for the at least one of installation of or access of the data tracking component configured to monitor an affinity-related activity including at least one of a sports affinity activity, a religious affinity activity, a music affinity activity, a literature affinity activity, a theater affinity activity, a film affinity activity, a television program affinity activity, a hobby affinity activity, a service affinity activity, or a product affinity activity.

12. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:
arranging for compensation to be received from the data consumer in exchange for the at least one of installation of or access of the data tracking component configured to monitor an affinity-related activity and to pair an aspect of the affinity-related activity with an aspect of a profile of the data provider.

13. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:
arranging for compensation to be received from the data consumer in exchange for the at least one of installation of or access of the data tracking component configured to monitor an affinity-related activity and to pair an aspect of the affinity-related activity with an aspect of a presumed profile of the data provider.

14. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a health-related activity including at least one of an ailment-related activity, a condition-related activity, a disease-related activity, a treatment-related activity, a prevention-related activity, a diet-related activity, an exercise-related activity, a mental-health related activity, or a wellness-related activity.

15. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a health-related activity and to pair an aspect of the health-related activity with an aspect of a profile of the data provider.

16. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a health-related activity and to pair an aspect of the health-related activity with an aspect of a presumed profile of the data provider.

17. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a consumer-related activity including at least one of a purchasing-related activity, a spending-related activity, an income-related activity, a credit-worthiness-related activity, a subscription-related activity, an ordering-related activity, a shopping-related activity, a browsing-related activity, a credit card-related activity, a debit card-related activity, a check writing-related activity, a delivery-related activity, a coupon-related activity, a selling-method-related activity, an offering-related activity, a promotional-event-related activity, or an advertising-related activity.

18. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from a data consumer in exchange for at least one of installation of or access of a data tracking component configured to monitor a consumer-related activity and to pair an aspect of the consumer-related activity with an aspect of a profile of the data provider.

19. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a consumer-related activity and to pair an aspect of the consumer-related activity with an aspect of a presumed profile of the data provider.

20. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a personal-characteristic-related activity including at least one of an age-related activity, a gender-related activity, a race-related activity, an income-related activity, a geographic location-related activity, a marital status-related activity, an education-related activity, an employment-related activity, a sexual orientation-related activity, a cultural-related activity, a personality characteristic-related activity, or a demographic-related activity.

21. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a personal-characteristic-related activity and to pair an aspect of the personal-characteristic-related activity with an aspect of a profile of the data provider.

22. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:

arranging for compensation to be received from the data consumer in exchange for the at least one of installation of or access of the data tracking component configured to monitor a personal-characteristic-related activity and to pair an aspect of the personal-characteristic-related activity with an aspect of a presumed profile of the data provider.

23. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:
arranging for compensation to be received from the data consumer in exchange for the at least one of installation of or access of the data tracking component configured to monitor a business entity-related activity including at least one of an employment-related activity, a management-related activity, a marketing-related activity, a sales-related activity, a plan-related activity, a profit-related activity, a loss-related activity, an asset-related activity, a liability-related activity, an inventory-related activity, or an overhead-related activity.

24. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:
arranging for compensation to be received from the data consumer in exchange for the at least one of installation of or access of the data tracking component configured to monitor a business entity-related activity and to pair an aspect of the business entity-related activity with an aspect of a profile of the data provider.

25. The computer-implemented method of claim 10, wherein arranging for compensation to be received from the data consumer in exchange for the at least one of installation of or access of the data tracking component configured to monitor at least one of an affinity-related activity, a health-related activity, a consumer-related activity, a personal-characteristic-related activity, or a business entity-related activity comprises:
arranging for compensation to be received from the data consumer in exchange for the at least one of installation of or access of the data tracking component configured to monitor a business entity-related activity and to pair an aspect of the business entity-related activity with an aspect of a presumed profile of the data provider.

26. The computer-implemented method of claim 1, further comprising:
providing a data product to the data consumer in accordance with the compensation arrangement.

27. The computer-implemented method of claim 1, further comprising:
monitoring a performance of the data consumer.

28. The computer-implemented method of claim 1, further comprising:
receiving compensation from the data consumer in accordance with the compensation arrangement.

29. The computer-implemented method of claim 1, further comprising:
compensating the data provider in accordance with the compensation arrangement.

30. A non-transitory signal-bearing medium bearing one or more instructions that, when executed by an executing component, perform a method comprising:
facilitating a compensation arrangement between a data provider and a data consumer regarding one or more data provider-related search activities, including arranging for compensation to be received from the data consumer in exchange for at least one of installation of or access of a data tracking component related to at least one user interface associated with the data provider, wherein the at least one of installation of or access of the data tracking component includes at least one of installation of or access of a data counter of data from the data tracking component; and
performing an analysis to determine a potential value of the data, wherein the potential value is at least partially based on how the data is organized.

31. A system, comprising:
an executing component;
a memory operatively coupled to the executing component; and
an arrangements component accessible by the executing component, the arrangements component being operable to facilitate a compensation arrangement between a data provider and a data consumer regarding one or more data-provider-related search activities, and the arrangements component being operable to arrange for compensation to be received from the data consumer in exchange for at least one of installation of or access of a data tracking component related to at least one user interface associated with the data provider, wherein the at least one of installation of or access of the data tracking component includes at least one of installation of or access of a data counter of data from the data tracking component, the arrangements component being operable to arrange for an analysis to determine a potential value of the data, wherein the potential value is at least partially based on how the data is organized, and wherein at least one of the executing component, the memory, or the arrangements component is at least partially implemented using hardware.

32. The system of claim 31, wherein the executing component comprises:
at least one of a computer, a controller, a processor, a programmable device, an application specific integrated circuits (ASIC), a field programmable gate array (FPGA), or a digital signal processor (DSP).

33. The system of claim 31, wherein the memory comprises:
at least one of a random access memory (RAM), a read only memory (ROM), an electrically erasable programmable ROM (EEPROM), a flash memory, a compact disk ROM (CD-ROM), a digital versatile disk (DVD), an optical storage device, a magnetic storage device, a cassette, a tape, a magnetic disk, a paper storage medium, or a punch card.

34. The system of claim 31, wherein the arrangements component being operable to arrange for compensation to be received from the data consumer in exchange for at least one of installation of or access of a data tracking component related to at least one user interface associated with the data provider comprises:
a component operable to arrange for compensation to be received from a data consumer in exchange for at least one of installation of or access of a cookie.

35. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of a persistent user profile.

36. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of an application.

37. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of a user-data-monitoring interactive web application related to the data provider.

38. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of at least one of a scripting language application, a JavaScript application, an applet, a Java applet, or an AJAX (asynchronous JavaScript and Extensible Markup Language (XML)) application.

39. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of a data tracking component loaded on a machine associated with a specific user.

40. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of a data tracking component loaded on a machine associated with a specific user's employer.

41. The system of claim 31, wherein the arrangements component being operable to arrange for compensation to be received from the data consumer in exchange for at least one of installation of or access of a data tracking component related to at least one user interface associated with the data provider comprises:
　　a component operable to arrange for compensation to be received from a data consumer in exchange for at least one of installation of or access of a data tracking component configured to monitor an aspect of the data provider's activities.

42. The system of claim 41, wherein the component operable to arrange for compensation to be received from a data consumer in exchange for at least one of installation of or access of a data tracking component configured to monitor an aspect of the data provider's activities comprises:
　　a component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity.

43. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
　　a component operable to arrange for compensation to be received from a data consumer in exchange for at least one of installation of or access of a data tracking component configured to monitor at least one of an affinity-related activity including at least one of a sports affinity activity, a religious affinity activity, a music affinity activity, a literature affinity activity, a theater affinity activity, a film affinity activity, a television program affinity activity, a hobby affinity activity, a service affinity activity, or a product affinity activity.

44. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
　　a component operable to arrange for compensation to be received from a data consumer in exchange for at least one of installation of or access of a data tracking component configured to monitor at least one of an affinity-related activity and to pair an aspect of the affinity-related activity with an aspect of a profile of the data provider.

45. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
　　a component operable to arrange for compensation to be received from a data consumer in exchange for at least one of installation of or access of a data tracking component configured to monitor at least one of an affinity-related activity and to pair an aspect of the affinity-related activity with an aspect of a presumed profile of the data provider.

46. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a health-related activity including at least one of an ailment-related activity, a condition-related activity, a disease-related activity, a treatment-related activity, a prevention-related activity, a diet-related activity, an exercise-related activity, a mental-health related activity, or a wellness-related activity.

47. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a health-related activity and to pair an aspect of the health-related activity with an aspect of a profile of the data provider.

48. The system of claim 47, further comprising:
the component operable to arrange for compensation configured to determine different levels of compensation due based at least partially on the data tracking component configured to monitor health related activities paired with one or more possible aspects of the profile of the data provider.

49. The system of claim 48, wherein the health related activities includes exercise related activities and wherein the one or more possible aspects of the profile of the data provider includes age.

50. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a health-related activity and to pair an aspect of the health-related activity with an aspect of a presumed profile of the data provider.

51. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a consumer-related activity including at least one of a purchasing-related activity, a spending-related activity, an income-related activity, a credit-worthiness-related activity, a subscription-related activity, an ordering-related activity, a shopping-related activity, a browsing-related activity, a credit card-related activity, a debit card-related activity, a check writing-related activity, a delivery-related activity, a coupon-related activity, a selling-method-related activity, an offering-related activity, a promotional-event-related activity, or an advertising-related activity.

52. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a consumer-related activity and to pair an aspect of the consumer-related activity with an aspect of a profile of the data provider.

53. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a consumer-related activity and to pair an aspect of the consumer-related activity with an aspect of a presumed profile of the data provider.

54. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a personal-characteristic-related activity including at least one of an age-related activity, a gender-related activity, a race-related activity, an income-related activity, a geographic location-related activity, a marital status-related activity, an education-related activity, an employment-related activity, a sexual orientation-related activity, a cultural-related activity, a personality characteristic-related activity, or a demographic-related activity.

55. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a personal-characteristic-related activity and to pair an aspect of the personal-characteristic-related activity with an aspect of a profile of the data provider.

56. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a personal-characteristic-related activity and to pair an aspect of the personal-characteristic-related activity with an aspect of a presumed profile of the data provider.

57. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a business entity-related activity including at least one of an employment-related activity, a management-related activity, a marketing-related activity, a sales-related activity, a plan-related activity, a profit-related activity, a loss-related activity, an asset-related activity, a liability-related activity, an inventory-related activity, or an overhead-related activity.

58. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a business entity-related activity and to pair an aspect of the business entity-related activity with an aspect of a profile of the data provider.

59. The system of claim 42, wherein the component operable to arrange for compensation to be received from a data consumer in exchange for at least one of installation of or access of a data tracking component configured to monitor at least one of an affinity-related activity, a health-related activity, a consumer-related activity, a personal-characteristic-related activity, or a business entity-related activity comprises:
a component operable to arrange for compensation to be received from a data consumer in exchange for at least one of installation of or access of a data tracking component configured to monitor at least one of a business entity-related activity and to pair an aspect of the business entity-related activity with an aspect of a presumed profile of the data provider.

60. The system of claim 31, further comprising:
a component operable to provide a data product to the data consumer in accordance with the compensation arrangement.

61. The system of claim 31, further comprising:
a component operable to monitor a performance of the data consumer.

62. The system of claim 31, further comprising:
a component operable to receive compensation from the data consumer in accordance with the compensation arrangement.

63. The system of claim 31, further comprising:
a component operable to compensate the data provider in accordance with the compensation arrangement.

* * * * *